US006959036B1

(12) United States Patent
Rezvani et al.

(10) Patent No.: US 6,959,036 B1
(45) Date of Patent: Oct. 25, 2005

(54) METHOD AND APPARATUS FOR AN X-DSL MODEM SUPPORTING MULTIPLE X-DSL LINE CODES

(75) Inventors: Behrooz Rezvani, Pleasanton, CA (US); Dale Smith, Fremont, CA (US); Sam Heidari, Fremont, CA (US); Homayoun Shahri, Santa Clara, CA (US)

(73) Assignee: Ikanos Communications Inc., Fremont, CA (US)

( * ) Notice: Subject to any disclaimer, the term of this patent is extended or adjusted under 35 U.S.C. 154(b) by 826 days.

(21) Appl. No.: 09/776,067

(22) Filed: Feb. 2, 2001

Related U.S. Application Data (60) Provisional application No. 60/179,899, filed on Feb. 2, 2000.

(51) Int. Cl.[7] ............................................. H04B 1/38
(52) U.S. Cl. .................. 375/222; 375/260; 375/285; 375/229; 370/210; 379/93.08
(58) Field of Search ................... 375/260, 285, 375/222, 229; 370/210; 379/93.08

(56) References Cited

U.S. PATENT DOCUMENTS

| | | | |
|---|---|---|---|
| 5,999,563 A | * | 12/1999 | Polley et al. ............... 375/222 |
| 6,044,107 A | * | 3/2000 | Gatherer et al. ............ 375/222 |
| 6,055,268 A | * | 4/2000 | Timm et al. ................ 375/229 |
| 6,137,839 A | * | 10/2000 | Mannering et al. ......... 375/260 |
| 6,411,657 B1 | * | 6/2002 | Verbin et al. ............... 375/285 |
| 6,512,739 B1 | * | 1/2003 | Heidari et al. ............. 370/210 |
| 6,549,512 B2 | * | 4/2003 | Wu et al. ................... 370/210 |
| 2002/0067811 A1 | * | 6/2002 | Matsumoto ............... 379/93.08 |

* cited by examiner

Primary Examiner—Stephen Chin
Assistant Examiner—Sudhanshu C. Pathak
(74) Attorney, Agent, or Firm—IP Creators; Charles C. Cary (57) ABSTRACT

An X-DSL modem supporting multiple X-DSL line codes including discrete multi-tone (DMT) and carrierless phase and amplitude (CAP). The modem includes: components coupled to one another to form a transmit path and a receive path. The components include an encoder component and a Fourier transform component. The encoder component encodes data associated with a CAP communication channel into QAM symbols and encodes data associated with a DMT communication channel into DMT sub-symbols. The Fourier transform component couples to the encoder component on the transmit path for transforming DMT sub-symbols from a frequency-to-time domain and for transforming QAM symbols from the time-to-frequency domain followed by a filtering in the frequency domain and a subsequent transformation back from the frequency-to-time domain to effect a pulse shaping function without requiring a discrete pulse shaping component in the transmit path.

4 Claims, 9 Drawing Sheets

DSP PACKETS

METHOD AND APPARATUS FOR AN X-DSL MODEM SUPPORTING MULTIPLE X-DSL LINE CODES

CROSS REFERENCE TO RELATED APPLICATION

This application claims the benefit of prior filed co-pending Provisional Application No. 60/179,899 entitled "HIGH LEVEL SYSTEM SPECIFICATION FOR U-MODEM" filed on Feb. 2, 2000 which is incorporated herein by reference in its entirety.

BACKGROUND OF THE INVENTION

1. Field of Invention

This invention relates generally to communications, and more particularly, X-DSL modems.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, SDSL, MDSL, RADSL, HDSL, etc. all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation.

X-DSL modems are typically installed in pairs, with one of the modems installed in a home and the other in the telephone companies central office (CO) switching office servicing that home. This provides a direct dedicated connection to the home from a line card at the central office on which the modem is implemented through the subscriber line or local loop. Modems essentially have three hardware sections: (a) an analog front end (AFE) to convert the analog signals on the subscriber line into digital signals and convert digital signals for transmission on the subscriber line into analog signals, (b) digital signal processing (DSP) circuitry to convert the digital signals into an information bit stream and optionally provide error correction, echo cancellation, and line equalization, and (c) a host interface between the information bit stream and its source/destination. Typically all of these components are located on a highly integrated single line card with a dedicated connection between one or more AFE's and a DSP.

Within each X-DSL protocol there are at least two possible line codes, or modulation protocols; i.e. discrete multi-tone (DMT) and carrierless AM/PM (CAP). The first of these line codes, i.e. DMT, requires the DSP to implement both an inverse fast Fourier transform (IFFT) on upstream data received from the subscriber and a fast Fourier transform (FFT) on the downstream data transmitted to the subscriber. Typically the DSP is available as a discrete semiconductor chip which implements the transforms for a dedicated one of the X-DSL standards using software routines running on an internal processor.

Each X-DSL installation represents a sizeable expense in hardware and service labor to provision the central office. The expense may not always be amortized over a sufficient period of time due the relentless introduction of new and faster X-DSL standards each of which pushes the performance boundaries of the subscriber line in the direction of increasing bandwidth and signal integrity. As each new standard involves, line cards must typically be replaced to upgrade the service.

What is needed is a less rigid signal DSP processing architecture that allows a more flexible hardware response to the evolving X-DSL standards and the problems associated with providing hardware to handle each new standard.

SUMMARY OF THE INVENTION

A method and apparatus for an X-DSL modem supporting multiple X-DSL line codes, protocols for a plurality of channels is disclosed. Each channel is packetized and each packet includes control information for controlling the performance of the components/modules on the transmit and receive path. Further flexibility is derived from an architecture which incorporates discrete and shared modules on the transmit path and the receive path. The transmit path and receive path modules are collectively controlled by control information in selected ones of the packets. This control information is used by selected ones of the modules to appropriately process each channel in conformance with the corresponding X-DSL protocol, operating on each channel's packets at an appropriate rate, and protocol for the channel. The DSP exhibits a favorable form factor, and flexibility as to protocols and line codes, and numbers of channels supported.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

A method and apparatus for an X-DSL modem supporting multiple X-DSL line codes, protocols for a plurality of channels is disclosed. Each channel is packetized and each packet includes control information for controlling the performance of the components/modules on the transmit and receive path. Further flexibility is derived from an architecture which incorporates discrete and shared modules on the transmit path and the receive path. The transmit path and receive path modules are collectively controlled by control information in selected ones of the packets. This control information is used by selected ones of the modules to appropriately process each channel in conformance with the corresponding X-DSL protocol, operating on each channel's packets at an appropriate rate, and protocol for the channel. The DSP exhibits a favorable form factor, and flexibility as to protocols and line codes, and numbers of channels supported.

Figure 1:
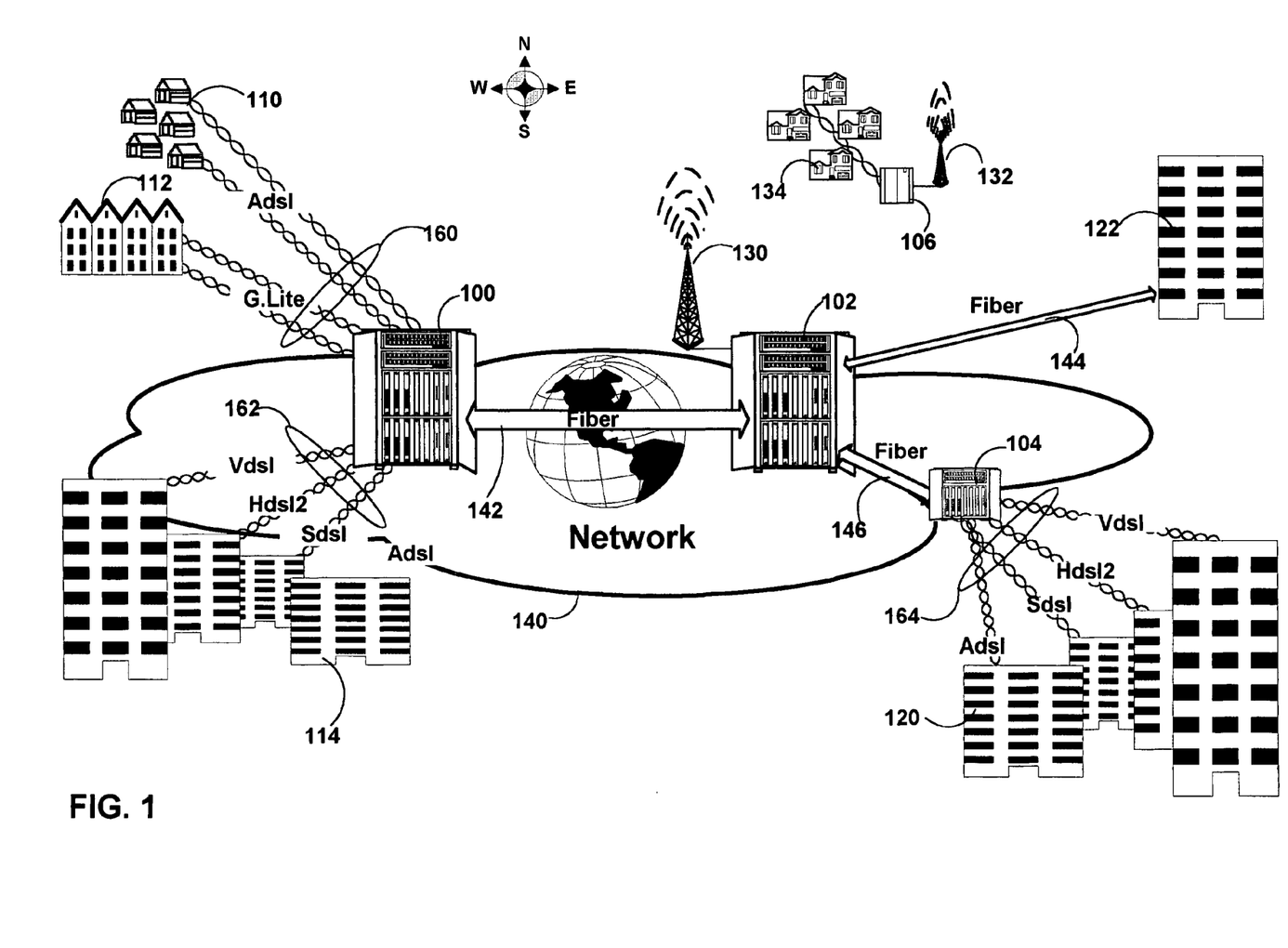
FIG. 1 depicts an overall system environment, implementing an embodiment of the invention, in which individual subscribers are coupled across public service telephone network (PSTN) subscriber lines with one or more high speed networks.

FIG. 1 depicts an overall system environment in which individual subscribers are coupled across public service telephone network (PSTN) subscriber lines with one or more high speed networks. Telco COs 100, 102, 106 and remote access terminal 104 are shown coupling various subscribers to one another and to a high speed network 140. The high speed network 140 provides fiber optic links between the central office and remote access terminal. CO's 100–102 are coupled to one another via fiber optic link 142. CO 102 couples to remote access terminal 104 via fiber optic link 146. CO also couples to subscriber site 122 via fiber optic link 144. CO 102 and CO 106 couple to one another via a wireless link provided by corresponding wireless transceivers 130 and 132 respectively. The "last mile" connecting each subscriber, (except subscriber 122) is provided by twisted copper PSTN telephone lines. On these subscriber lines voice band and data communication are provided. The data communication is shown as various X-DSL protocols including G.Lite, ADSL VDSL, and HDSL2. CO 100 is coupled via G.Lite and ADSL modulated subscriber line connections 160 with subscribers 110 and 112. CO 100 is also coupled via G.Lite and ADSL modulated subscriber line connections 162 with subscriber 114. CO 106 is also coupled via a subscriber line to subscriber 134. Remote access terminal is coupled via subscriber line connections 164 with subscribers 120. In each case the corresponding CO may advantageously be provided with distributed AFE and DSP resources for handling multiple protocols from multiple locations with the added benefit of load balancing, and statistical multiplexing. The apparatus and method of the current invention is suitable for handling communications on any of these subscriber lines.

In an alternate embodiment of the invention communications are also provided between DSP resources at one site, e.g. CO 100 and AFE resources at a separate site, e.g. CO 102. This later capability allows distributed processing whereby all DSP resources can be placed in a logical server environment hence supporting a client server architecture.

Figure 2:
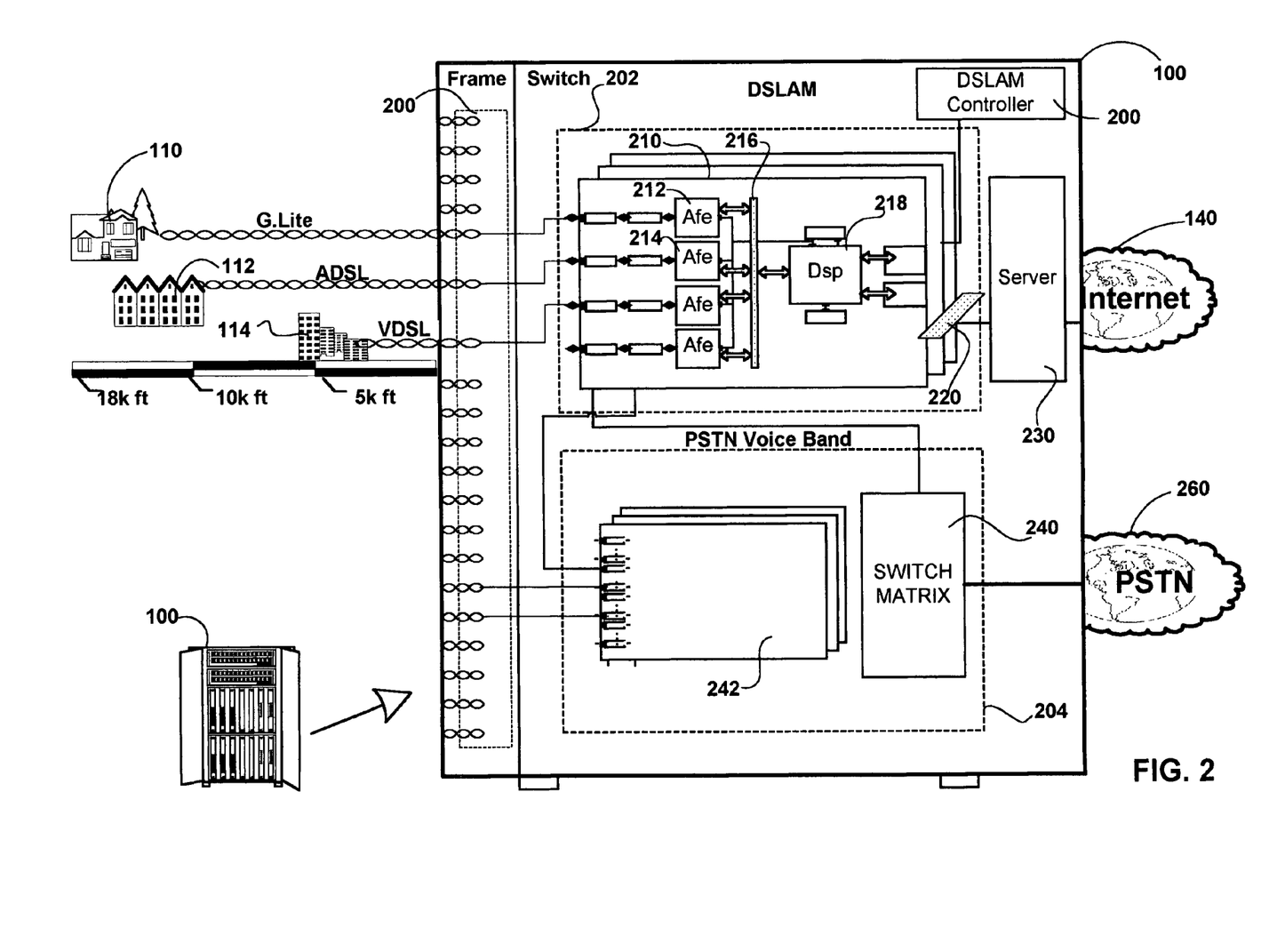
FIG. 2 depicts a more detailed view of a representative one of the central offices shown in FIG. 1 including both digital subscriber line access modules (DSLAMs) and PSTN voice band modules.

FIG. 2 depicts a more detailed view of a representative one of the central offices shown in FIG. 1 including both digital subscriber line access modules (DSLAMs) and PSTN voice band modules. The CO 100 includes subscriber line connections to subscribers 110–114. Each of these connections terminates in the frame room 200 of the CO. From this room connections are made for each subscriber line via splitters and hybrids to both a DSLAM 202 and to the voice band racks 204. The splitter shunts voice band communications to dedicated line cards, e.g. line card 242 or to a voice band modem pool (not shown). The splitter shunts higher frequency X-DSL communications on the subscriber line to a selected line card 210 within DSLAM 202. The line cards of the current invention are universal, meaning they can handle any current or evolving standard of X-DSL and may be upgraded on the fly to handle new standards.

Voice band call set up is controlled by a Telco switch matrix 240 such as SS7. This makes point-to-point connections to other subscribers for voice band communications. The X-DSL communications may be processed by a universal line card such as line card 210. That line card includes a plurality of AFE's e.g. 212–214 each capable of supporting a plurality of subscriber lines. The AFEs are coupled via a proprietary packet based bus 216 to a DSP 218 which is also capable of multi-protocol support for all subscriber lines to which the AFE's are coupled. The line card itself is coupled to a back-plane bus 220 which may in an embodiment of the invention be capable of offloading and transporting low latency X-DSL traffic between other DSPs for load balancing. Communications between AFE's and DSP(s) are packet based which allows a distributed architecture such as will be set forth in the following FIG. 3 to be implemented. Each of the DSLAM line cards operates under the control of a DSLAM controller 200 which handles global provisioning, e.g. allocation of subscriber lines to AFE and DSP resources. Once an X-DSL connection is established between the subscriber and a selected one of the DSLAM submodules, e.g. AFE and DSP the subscriber will be able to access any network to which the DSLAM is connected. In the example shown the DSLAM couples via server 230 with Internet 140.

Figure 3:
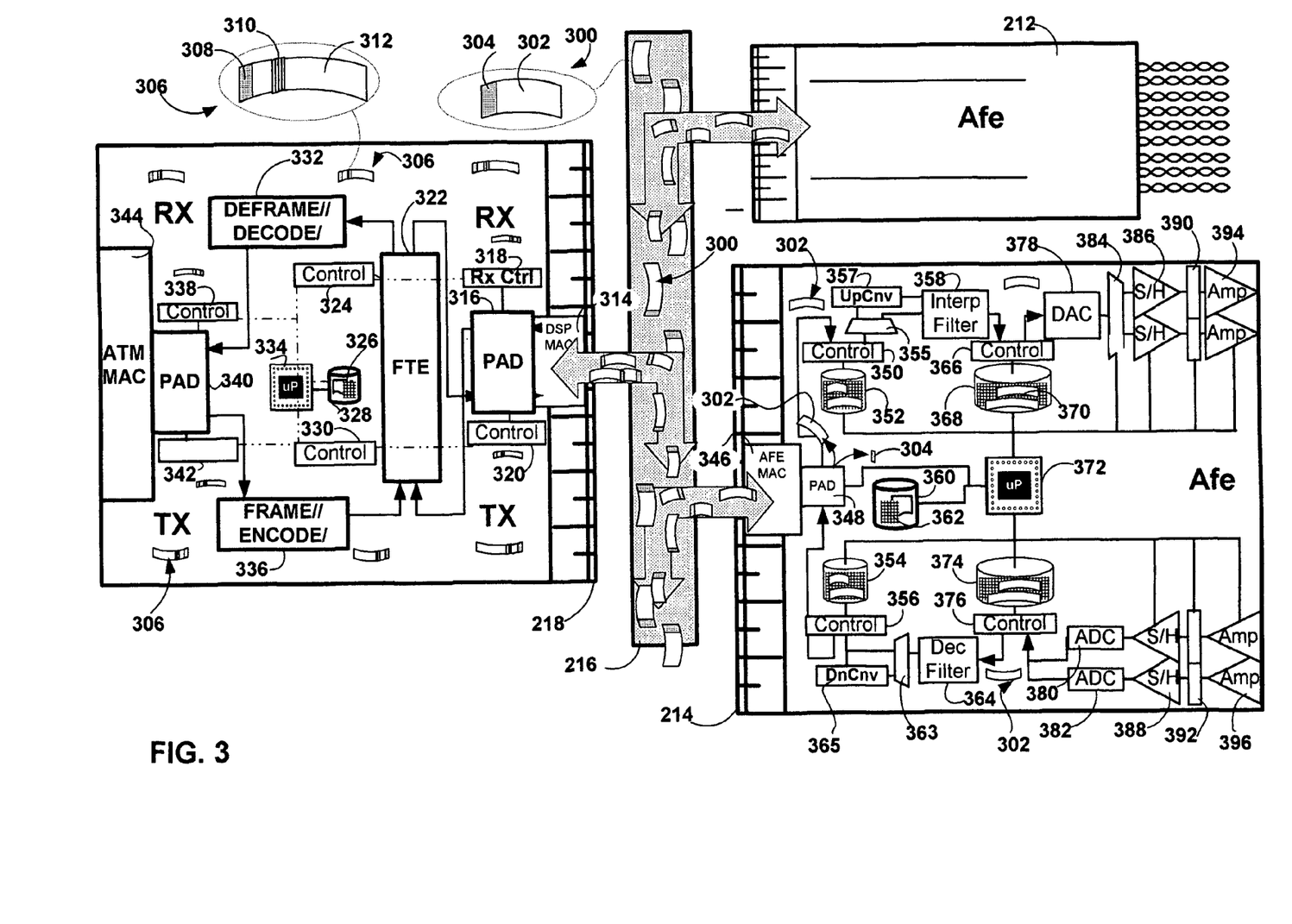
FIG. 3 is an expanded hardware view of one of the line cards in the central office shown in FIG. 2.

FIG. 3 is a chip level view of an embodiment of the invention in which multiple AFE's chips 212–214 connect with a DSP chip 218 across bus 216. They all may be mounted on the line card 210 shown in FIG. 2. Packets of raw data are shown being transported between the DSP and AFEs as well as within each DSP and AFE. Packet processing between the DSP and AFE chips involves transfer of bus packets 300. Packet processing within a DSP may involve device packets 306 (See FIG. 5). Packet processing within an AFE may involve raw data packets 302. These will be discussed in the following text.

These modules, AFE and DSP, may be found on a single universal line card, such as line card 210 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

The DSP chip 218 includes an upstream (receive) and a downstream (transmit) processing path with both discrete and shared modulation and demodulation modules. Selected ones of the modules are responsive to packet header information and/or control information to vary their processing of each packet to correspond with the X-DSL protocol and line code and channel which corresponds with the packet contents. Data for each of the channels is passed along either path in discrete packets the headers of which identify the corresponding channel and may additionally contain channel specific control instructions for various of the shared and discrete components along either the transmit or receive path.

On the upstream path, upstream packets containing digital data from various of the subscribers is received by the DSP medium access control (MAC) 314 which handles packet transfers to and from the DSP bus. The MAC couples with a packet assembler/disassembler (PAD) 316. The operation of the DSP PAD for upstream packets is managed by controller 318. For upstream packets, the PAD handles removal of the DSP bus packet header and insertion of the device header and control header which is part of the device packet 306. (See FIG. 5). The content of these headers is generated by the core processor 334 using information downloaded from the DSLAM controller 200 (See FIG. 2) as well as statistics such as gain tables gathered by the de-framer 332, or embedded operations channel communications from the subscriber side. These channel specific and control parameters 326 are stored in memory 328 which is coupled to the core processor. The PAD 316 embeds the required commands generated by the core processor in the header or control portions of the device packet header of the upstream data packets. The upstream packets may collectively include data from multiple channels each implementing various of the X-DSL protocols. Thus the header of each device packet identifies the channel corresponding with the data contained therein. Additionally, a control portion of the packet may include specific control instructions for any of the discrete or shared components which make up the upstream or downstream processing paths. In the embodiment shown, the Fourier transform engine (FTE) 322 is a component which is shared between the upstream and downstream paths. Thus, on the upstream path each upstream packet is delivered to the FTE for demodulation. The input controller 330 handles the mapping of data and the processing of the packets as it flows through FTE. The information in the header of the packet is used by the controller 330 to maintain the channel identity of the data as it is demodulated, to setup the FTE at the appropriate parameters for that channel, e.g. sample size, and to provide channel specific instructions for the demodulation of the data. The demodulated data is passed under the control of output controller 324 as a packet to the next component in the upstream path, i.e. the deframer and Reed Solomon decoder 332 for further processing. This component reads the next device packet and processes the data in it in accordance with the instructions or parameters in its header. The demodulated, decoded and de-framed data is passed to the asynchronous transfer mode (ATM) PAD 340 operating under the control of controller 338. In the ATM PAD the device packet header is removed and the demodulated data contained therein is wrapped with an ATM header. The packet is then passed to the ATM MAC 344 for transmission of the ATM packet on the ATM network 140 (See FIGS. 1–2).

On the downstream path, downstream packets containing digital data destined for various subscribers is received by the ATM MAC 344 which handles transfers to and from the ATM network 140. The ATM MAC passes each received packet to the ATM PAD 340 where the ATM header is removed and the downstream device packet 306 is assembled. The operation of the ATM PAD for downstream packets is managed by controller 342. Using header content generated by the core processor 334 the PAD assemble data from the ATM network into channel specific packets each with their own header, data and control portions. The downstream packets are then passed to the Framer and Reed Solomon encoder 336 where they are processed in a manner consistent with the control and header information contained therein. The Framer downstream packets are then passed to the input of the FTE. The control 330 governs the multiplexing of these downstream packets which will be modulated by the FTE with the upstream packets which will be demodulated therein. Each downstream packet with the modulated data contained therein is then passed to the DSP PAD. In the DSP PAD the device packet header and control portions are removed, and a DSP bus header 304 is added. This header identifies the specific channel and may additionally identify the sending DSP, the target AFE, the packet length and such other information as may be needed to control the receipt and processing of the packet by the appropriate AFE. The packet is then passed to the DSP MAC for placement on the DSP bus 216 for transmission to the appropriate AFE.

FIG. 3 also shows a more detailed view of the processing of upstream and downstream packets within the AFE. In the embodiment of the invention shown, device packets are not utilized in the AFE. Instead, channel and protocol specific processing of each packet is implemented using control information for each channel stored in memory at session setup.

Downstream packets from the DSP are pulled off the bus 216 by the corresponding AFE MAC on the basis of information contained in the header portion of that packet. The packet is passed to AFE PAD 346 which removes the header 304 and sends it to the core processor 372. The core processor matches the information in the header with channel control parameters 362 contained in memory 360. These control parameters may have been downloaded to the AFE at session setup. The raw data 302 portion of the downstream packet is passed to FIFO buffer 352 under the management of controller 350. Each channel has a memory mapped location in that buffer. For packets implementing a CAP line code multiplexer 355 switches the packet to the up converter 357. DMT line code packets are passed directly to the interpolator and filter 358 reads a fixed amount of data from each channel location in the FIFO buffer. The amount of data read varies for each channel depending on the bandwidth of the channel. The amount of data read during any given time interval is governed by the channel control parameters 362, discussed above. The interpolator upsamples the data and low pass filters it to reduce the noise introduced by the DSP. Implementing interpolation in the AFE as opposed to the DSP has the advantage of lowering the bandwidth requirements of the DSP bus 216. From the interpolator data is passed to the FIFO buffer 368 under the control of controller 366. The downstream packets 370 may increase in size as a result of the interpolation. The next module in the transmit pipeline is a DAC 378 which processes each channel in accordance with commands received from the core processor 372 using the control parameters downloaded to the control table 362 during channel setup. The analog output of the DAC is passed via analog mux 384 to a corresponding one of sample and hold devices 386. Each sample and hold is associated with a corresponding subscriber line. The sampled data is filtered in analog filters 390 and amplified by line amplifiers 394. The parameters for each of these devices, i.e. filter coefficients, amplifier gain etc. are controlled by the core processor using the above discussed control parameters 362. For example, where successive downstream packets carry downstream channels each of which implements different protocols, e.g. G.Lite, ADSL, and VDSL the sample rate of the analog mux 384 the filter parameters for the corresponding filter 390 and the gain of the corresponding analog amplifiers 394 will vary for each packet. This "on the fly" configurability allows a single downstream pipeline to be used for multiple concurrent protocols.

On the upstream path many of the same considerations apply. Individual subscriber lines couple to individual line amplifiers 396 through splitter and hybrids (not shown). Each channel is passed through analog filters 392, sample and hold modules 388 and dedicated ADC modules 380–382. As discussed above in connection with the downstream/transmit path, each of these components is configured on the fly for each new packet depending on the protocol associated with it. Each upstream packet is placed in a memory mapped location of FIFO memory 374 under the control of controller 376. From the controller fixed amounts of data for each channel, varying depending on the bandwidth of the channel, are processed by the decimator and filter module 364. The amount of data processed for each channel is determined in accordance with the parameters 362 stored in memory 360. Those parameters may be written to that table during the setup phase for each channel.

From the decimator and filter the raw DMT modulated data 302 is passed to FIFO buffer 354 which is controlled by controller 356. For CAP QAM modulated packets the multiplexer 363 switches the packets through the down converter 365 after which they also are passed to the FIFO buffer 354. Scheduled amounts of this data are moved to PAD 348 during each bus interval. The PAD wraps the raw data in a DSP header with channel ID and other information which allows the receiving DSP to properly process it. The upstream packet is placed on the bus by the AFE MAC 346. A number of protocols may be implemented on the bus 216. In an embodiment of the invention the DSP operates as a bus master governing the pace of upstream and downstream packet transfer and the AFE utilization of the bus.

Figure 4:
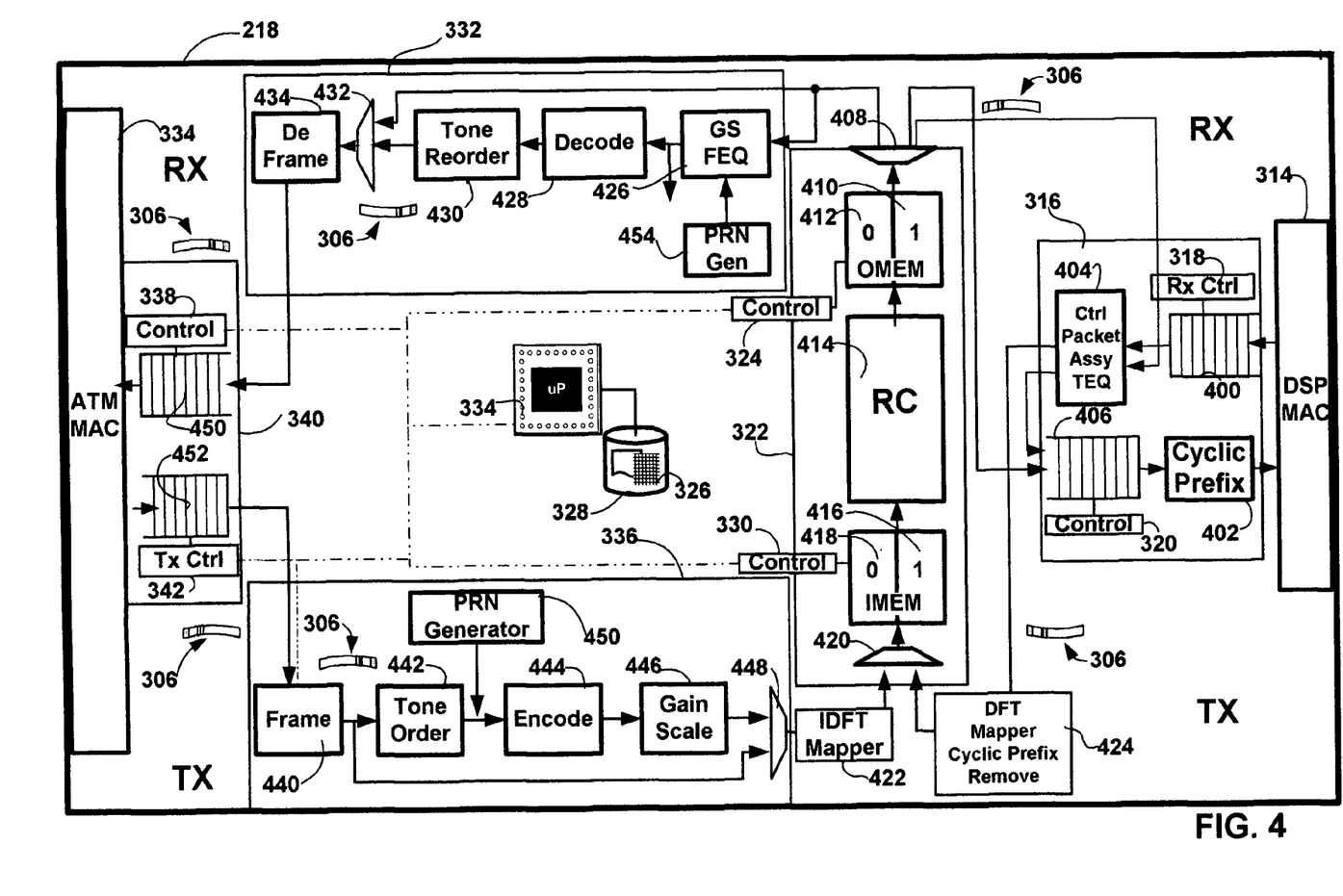
FIG. 4 is an expanded hardware view of the digital signal processor portion (DSP) of the line card shown in FIG. 3.

FIG. 4 is an expanded hardware view of the digital signal processor portion (DSP) of the line card shown in FIG. 3. Submodules of each of the DSP Pad 316, the FTE 322, the Deframer-decoder 332, the framer-encoder 336 and the AFE PAD 340 are shown.

On the upstream (receive) packet path, the AFE PAD includes a first-in-first-out (FIFO) buffer 400 where upstream packets from the AFEs are stored. Any time domain equalization is performed by the control packet assembler 404 which also injects header and/or control information into the packets to control their demodulation by each of the demodulation components. Time domain equalization (TEQ) filtering which is a digital process designed to normalize the impact of differences in channel response. The filter may be implemented as an FIR filter. Each packet is then passed to the DFT mapper 424. The DFT mapper is coupled to the input memory portion of the FTE via a multiplexer 420. The mapper handles writing of each sample set from a packet into the input memory in the appropriate order. The mapper may also handle such additional functions as cyclic prefix removal which is required for DMT line code and is not required for CAP QAM line coded channels. The input memory comprises two portions 416 and 418. Multiplexer 420 provides access to these memories. While one sample set, e.g. time or frequency domain data, is being written from the upstream or downstream data paths into one of the memories the contents of the other of the memories are written into the row and column component 412 of the FTE 322. Once the DFT is completed by the row and column component, the frequency domain coefficients generated thereby are stored in either of portions 408–410 of the output memory of the FTE. These coefficients correspond with each of the DMT subcarriers. A multiplexer 408 handles the coupling of the output memory to either the next component of the upstream path, i.e. the deframer-decoder 332 or of the downstream path. Next on the upstream path, the device packet with header and data portions and optional control portion is passed to the remaining components of the upstream path. These include the gain scaler frequency-domain equalizer (FEQ) 424, pseudo random noise (PRN) generator 454, the decoder 426, the tone re-orderer 428 and the deframer 432.

A multiplexer 430 couples the deframer input to either the tone reordered 428 or to the output memory of the FTE. Each of these components is individually configurable on a per channel basis using tables stored locally in registers within each component, or within memory 328. The access to these tables/registers is synchronized by the logic in each of the components which responds to header or control information in each upstream packet to alter tone ordering/re-ordering, gain scaling constants per-tone per-channel, and FEQ constants per-tone per-channel. The processor 334 may initialize all the registers. From the deframer packets are passed to the FIFO buffer 450 which is part of ATM PAD 340.

The core processor 334 has DMA access to the FIFO buffer 450 from which it gathers statistical information on each channel including gain tables, or gain table change requests from the subscriber as well as instructions in the embedded operations portion of the channel. Those tables 326 are stored by the core processor in memory 328. When a change in gain table for a particular channel is called for the core processor sends instructions regarding the change in the header of the device packet for that channel via PAD 316. The core processor 334 then writes the new gain table to a memory, e.g. memory 326, which can be accessed by the appropriate component, e.g. FTE 322 or Gain Scalar 426. As the corresponding device packet is received by the relevant component that component, e.g. the gain scalar applies the updated parameters to appropriately scale the data portion of the packet and all subsequent packets for that channel. This technique of in band signaling with packet headers allows independent scheduling of actions on a channel by channel basis in a manner which does not require the direct control of the core processor. Instead each module in the transmit path can execute independently of the other at the appropriate time whatever actions are required of it as dictated by the information in the device header which it reads and executes.

On the downstream (transmit) path a FIFO buffer 452 within the AFE PAD 340 holds incoming packets. These are passed to the components in the Framer and Encoder module 306 for processing. The components of that module include the framer 440, tone orderer 442, PRN generator 450, encoder 444 and gain scalar 446. They are coupled via a multiplexer 448 to the IDFT mapper 422. As was the case with the deframer, the framer will use protocol specific information associated with each of these channels to look for different frame and super frame boundaries. The tone orderer supports varying number of tones, bytes per tone and gain per tone for each of the X-DSL protocols. For example the number of tones for G.Lite is 128, for ADSL is 256 and for VDSL 2048. The number of bits to be extracted per tone is read from the tone-ordering table or register at the initiation of processing of each packet. For example as successive packets from channels implementing G.Lite, ADSL and VDSL pass through the DMT Tx engine the number of tones will vary from 128 for G.lite, to 256 for ADSL, to 2048 for VDSL. In the encoder 444 constellation mapping is performed based on the bit pattern of each packet. The output is a two dimensional signal constellation in the complex domain.

Next in the IDFT mapper each device packet is correlated with a channel and protocol and mapped into input memory via a connection provided by multiplexer 420. The mapping is in a row and column order. Next in the FTE, the complex symbols are modulated into carriers or tones in the row and column transform component 414 and placed in either portion 410 or 412 of output memory. The dimensions of the row and column transforms vary on a channel specific basis as shown in the following FIG. 1C. Next a packet with the memory contents, i.e. the tone sequence is passed as a packet via multiplexer 408 to the DSP FIFO buffer 406. This is part of DSP PAD 316. Individual packets are moved from this buffer to the cyclic prefix component 402 for the addition of the appropriate prefix/suffix. The cyclic prefix component is responsive to the device packet header which identifies the charnel for which data is being processed. This can be correlated with the required prefix/suffix extensions for the protocol associated with the charnel on the basis of parameters 326 stored in main memory 328 or within dedicated registers in the component. For example the cyclic extension for G.Lite is 16, for ADSL 32, and for VDSL 320.

This device architecture allows the DSP transmit and receive paths to be fabricated as independent modules or submodules which respond to packet header and or control information for processing of successive packets with different X-DSL protocols, e.g. a packet with ADSL sample data followed by a packet with VDSL sampled data A mixture of different control techniques are used to control the behavior of the individual components of the DSP. The packet header may simply identify the channel. The component receiving the packet may then reference internal registers or downloaded tables such as table 326 to correlate the channel with a protocol and the protocol with the corresponding parameters with which the data portion of the packet is to be processed. Alternately the device packet may contain specific control information such as that associated with shutting down a channel, idling a channel, or shutting down the DSP.

The modules of the DSP 218 and AFE 214 support both CAP QAM with a significant overlap or sharing of components. That functionality is achieved in the manner set forth below in which each of the modules of the transmit and receive path are compared in terms of the manner in which they handle packets corresponding with channels which implement CAP QAM or DMT line codes.

Transmit Path—DMT Line Code

The DMT transmit path consists of the following blocks: Framer 440, tone orderer 442; constellation mapper/encoder 444; Gain Scaler 446; FTE 322; Cyclic Prefix 402; Interpolation Filter 358; and DAC 378; and analog components 384, 386, 390,394.

The framer 440 and tone orderer 442 receives a set of bits from an external interface, performs scrambling when necessary, performs any coding necessary for forward error correction (Reed-Solomon encoding and interleaving), and groups the encoded bits for presentation to the constellation mapper.

The constellation mapper/encoder 444 accepts an N bit input from the framer (N is programmable from 1 to 15) and generates the appropriate DMT sub-symbol at its output. This DMT sub-symbol is output to the gain scaling function.

The gain scaling function 446 receives a DMT sub-symbol and multiples it by a programmable constant. This constant scales each IFFT input bin with an independent value. The DMT sub-symbol is passed to the appropriate input bin of the IFFT memory 416–418 via IDFT mapper 422.

The IFFT function 322 receives M baseband DMT sub-symbols, where M is programmable depending on the X-DSL protocol in use (ADSL, VDSL, etc.) for the corresponding packet and performs a simultaneous upconversion of all M baseband signals to the desired offset-baseband carrier frequencies. The resulting DMT symbol is an aggregate version of the M baseband sub-symbols. The DMT symbol is then passed to the cyclic prefix block.

The cyclic prefix block 402 receives a DMT symbol, replicates the final L samples of the DMT symbol (L programmable), and pre-appends the L samples to the beginning of the DMT symbol. The augmented symbol is then passed as a serial sample stream via packets across bus 216 to the AFE 214 and specifically the interpolation filter 358. Switching of in the AFE is accomplished by the multiplexer 355 which directs DMT encoded packets to the Interpolation filter 358 and CAP QAM encoded packets first to the up converter 357.

In the AFE the interpolation filter 358 receives a packetized serial sample stream, increases the sample rate of the sample stream so that it matches the DAC input sample rate. The interpolation filter 358 uses multirate signal processing to increase the rate and filter out any spectral images caused by the rate increase. The interpolated data is output to the DAC 378.

The DAC 378 receives a serial sample stream and converts it from digital bits to analog voltage. The analog signal is then passed on to analog processing to properly condition the signal for transmission on the line.

Transmit Path—CAP QAM Line Code

The CAP/QAM transmitter consists of the following blocks: framer 440, tone orderer 442; constellation mapper/encoder 444; pulse shaping (using gain scaler 446, FTE 322, and cyclic prefix remover 404—note this module is multiplexed via multiplexer 408 between the transmit and receive path for this function); upconverter 357; interpolation filter 358; DAC 378 and other analog components.

The framer 440 receives a set of bits from an external interface, performs scrambling when necessary, performs any coding necessary for forward error correction (Reed-Solomon encoding and interleaving), and groups the encoded bits for presentation to the constellation mapper.

The constellation mapper/encoder 444 accepts an N bit input from the framer and generates the appropriate QAM symbol at its output. This QAM symbol is output to the pulse shaping function.

The pulse shaping function receives a complex valued QAM symbol from the constellation mapper/encoder and performs independent lowpass filtering of the real part and the imaginary part of the input QAM symbol. This limits the bandwidth of the QAM signal to a particular bandwidth and also applies notches for HAM radio egress control. This filter is programmable. The filtering is performed with the gain scaler 446 and the FFT engine 322 using a standard frequency domain filtering algorithm (overlap-save). First, the FFT engine 322 collects a block of input symbols and performs an FFT to convert the data to the frequency domain. Second, the frequency domain data is multiplied with the frequency domain filter coefficients in gain scaler 446. Third, the resulting data is passed back to the FFT engine 322 which performs an inverse FFT. Finally, the time-domain combiner 404, prefix remover, completes the filtering using the overlap-save algorithm. The filtered data is then passed to the upconverter within the AFE via bus 216 and multiplexer 355.

The upconverter 357 receives a baseband, pulse-shaped, complex QAM symbol stream and modulates it to the appropriate carrier frequency using multirate signal processing techniques. The incoming real and imaginary data streams are multiplied by an alternating stream of +1 and −1 and then are (interleaved/muxed) into a single data stream at twice the input rate. This signal is passed to the interpolation function.

The interpolation filter 358 receives a serial sample stream, increases the sample rate of the sample stream so that it matches the DAC input sample rate. For multi-band systems, the interpolation happens in two stages, where each band is up sampled to a common sample rate and added together. Next the composite signal is up sampled to the DAC rate. The interpolation filter uses multirate signal processing to increase the rate and filter out any spectral images caused by the rate increase. The interpolated data is output to the DAC 378.

The DAC 378 receives a serial sample stream and converts it from digital bits to analog voltage. The analog signal is then passed on to analog processing to properly condition the signal for transmission on the line.

Receive Path—DMT Line Code

The DMT receive path consists of the following blocks: analog inputs 396, 392, 388 to the ADC 382, decimation Filter 364; time domain equalization 404, cyclic prefix removal 424; FFT 322; FEQ 426; Slicer/Demapper 428,430 and deframer 434.

The ADC 382 receives an analog voltage and from the front-end analog processing blocks and converts into digitized samples. The data is forwarded to the decimation block.

The decimation filter 364 receives a stream of samples from a wideband DMT signal and resamples the data with a lower sampling frequency, which is the Nyquist rate for the particular line code in use. The decimator uses multi-rate signal processing methods to decrease the sample rate and attenuate any high frequency signal components which could alias in-band. The decimated data is switched via multiplexer 363 directly to the buffer 354, across bus 216 to the TEQ filter 404 of the DSP.

The TEQ filter 404 receives samples from the decimator and passes them through a programmable FIR filter in order to equalize the data in the time domain. Also, DMT symbol boundaries are determined in this function. The equalized data along with the symbol boundary are passed to the cyclic prefix removal function.

The cyclic prefix removal function 4224 receives a DMT symbol which has a cyclic prefix appended. Using symbol boundary information, the prefix is stripped off and discarded. The remainder of the DMT symbol is forwarded to the DFT engine 322.

The FFT function 322 receives a DMT symbol and performs an N-point FFT in order to simultaneously downconvert N DMT signals to baseband. N is a programmable number based on the line code in use. The baseband data is forwarded in parallel to the FEQ 426.

The FEQ 426 performs frequency domain equalization using a complex-valued single-tap adaptive equalizer per DMT subchannel (FFT bin). The FEQ adapts by minimizing the error between the received DMT sub-symbol and the hard decision value of the DMT sub-symbol. The equalized symbol is passed to the slicer/demapper 428,430.

The slicer/demapper (428,430) receives equalized symbols from the FEQ, passes the data through a decision device (programmable depending on the number of bits per DMT subsymbol) and reformats the data so that it is compatible with the FEC decoding blocks.

The deframer 434 receives data from the demapper, and performs deinterleaving and removes parity through Reed-Solomon decoding. The deinterleaving and decoding scheme is programmable based on the line code or standard in use. Next, the deframer descrambles the data with an algorithm defined for the line code. Finally, the deframer reformats the data and sends it to an external interface.

Receive Path—CAP Line Code

The CAP/QAM receive path consists of the following blocks: analog inputs 396, 392, 388 to the ADC 382, decimation Filter 364; Downconverter 365; Matched Filter (uses TEQ 404); feedforward equalizer (uses FFT engine 322, FEQ 426, and cyclic prefix removal 424); slicer/demapper 426,428; Decision Feedback Equalizer (not shown); demapper 426,428; and deframer 434.

The ADC 382 receives an analog voltage and from the front-end analog processing blocks and converts into digitized samples. The data is forwarded to the decimation block. The decimation filter 364 receives a stream of samples from a wideband QAM signal and resamples the data with a lower sampling frequency. The decimator uses multi-rate signal processing methods to decrease the sample rate and attenuate any high frequency signal components which could alias in-band.

The decimated data is passed on to the downconverter 365 via multiplexer 363. The sampling rate after decimation to be 4 times the center frequency. The downconverter receives a real-valued sample of a QAM waveform and demultiplexes/deinterleaves it into two data streams (even numbered samples and odd numbered samples). The even/odd data stream is multiplied by an alternating sequence of +1 and −1 to downconvert the data to complex baseband. The complex valued data is then passed to the matched filter function.

Next the data is transferred to the DMT where the FIR filter utilized to implement the TEQ function is instead utilized with new coefficients loaded to the FIR filter. The matched filter function 404 performs FIR filtering of the received complex data with a filter matched to the shaping filter used in the transmitter. The filtered data is passed to the feedforward equalizer.

The feedforward equalizer is the first part of standard equalization method called decision feedback equalization and is implemented using the FFT engine 322, FEQ 426, and cyclic prefix removal 424. In this implementation, the feedforward FIR filter is implemented using the standard overlap-save filtering technique. The feedforward equalizer receives a block of data from the matched filter, performs an FFT 322, multiplies the data with the filter coefficients 426, performs an inverse FFT 322 and then recombines the data in the time domain using the overlap-save method 424. The feedforward equalized data is then passed to the slicer.

The slicer 428,430/decision feedback filter receives a QAM symbol, subtracts a fed-back error term and then passes the data through a decision device to "slice" the data and recover the N-bit representation of the symbol. The sliced data is passed to the demapper 428 and a FIR filter (not shown) which is used to generate the feedback error term (the error term is the convolution of the sliced data with the FIR filter). The demapper 428,430 receives equalized symbols from the decision feedback equalizer and reformats the data so that it is compatible with the FEC decoding blocks.

The deframer 434 receives data from the demapper, and performs deinterleaving and removes parity through Reed-Solomon decoding. The deinterleaving and decoding scheme is programmable based on the line code or standard in use. Next, the deframer descrambles the data with an algorithm defined for the line code. Finally, the deframer reformats the data and sends it to an external interface.

As is evident from the above discussion each module in the transmit and receive paths reconfigures itself responsive to control or header information in each of the packets. The FFT for example transmits DMT packets by modulating baseband frequency up to carrier frequency and demodulates received DMT line code packets from carrier frequency down to baseband. For CAP QAM line code packets transmission involves frequency domain filtering with an FFT and an IFFT pair to perform low pass filtering, pulse shaping and egress control. For CAP QAM reception the FFT 332 is used to perform frequency domain filtering to perform linear equalization to clean up the spectrum of received packets.

Figure 5:
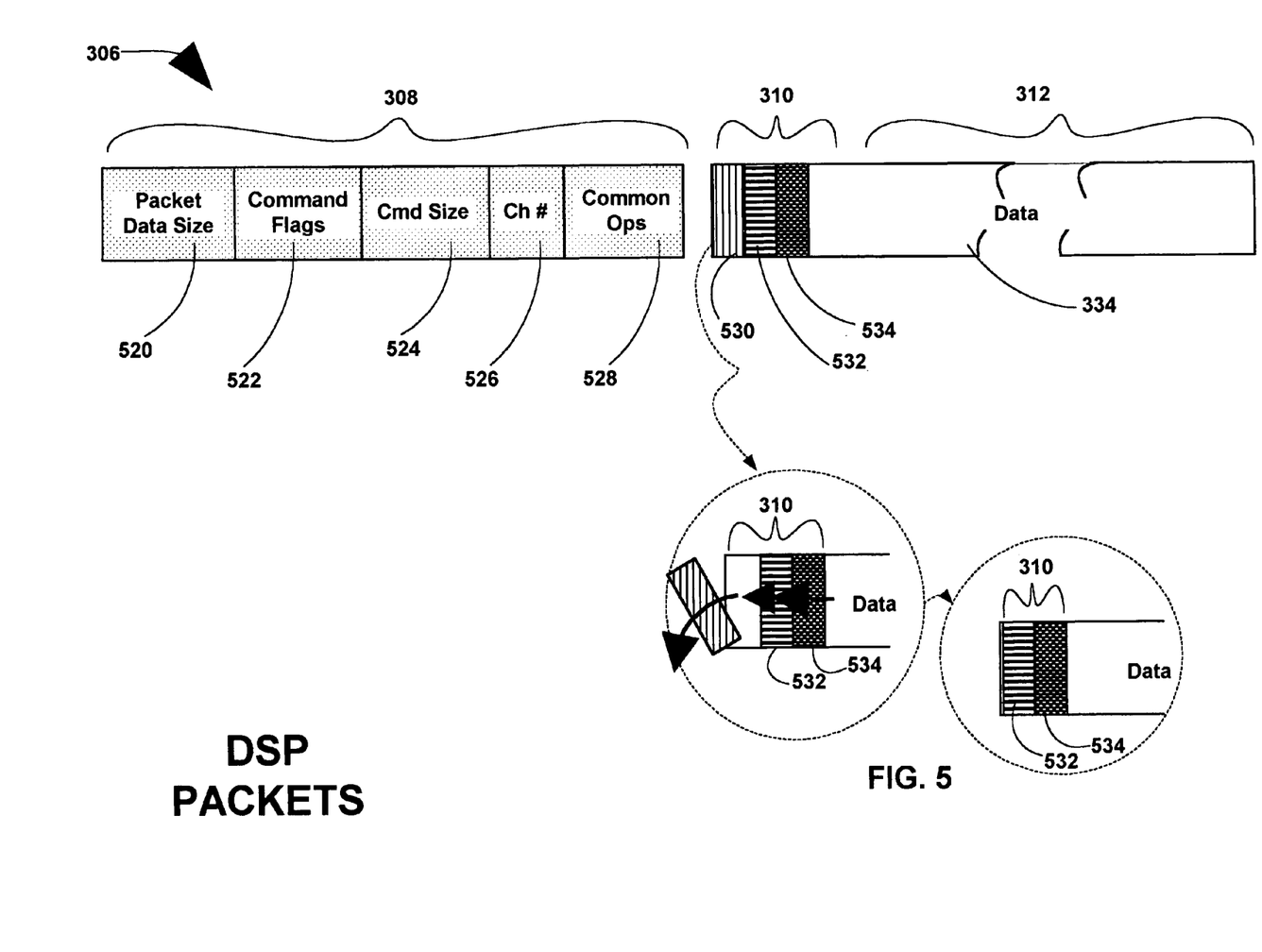
FIG. 5 shows the packet structure for passing data through and controlling the operation of various components within the DSP shown in FIG. 4.

FIG. 5 shows the device packet structure for passing data through and controlling the operation of various components within the DSP shown in FIG. 4. The device packets each include a header portion 308, a command portion 310 and a payload or data portion 312. In an embodiment of the invention the header is of a fixed length. The header in this embodiment of the invention includes five fields. Field 520 contains a value corresponding with the size of the packet. Field 526 identifies the channel associated with the packet. Field 528 indicates any common operations among modules to be performed on a channel, i.e. active, inactive, idle etc. Field 522 contains flags for each module in the associated path, i.e. transmit or receive, and a command size field 524. The command portion 310 may contain no command blocks or may contain command blocks for one or more of the modules or components on the transmit/receive path. Three command blocks 530, 532, 534 are shown.

The core processor 334 (See FIGS. 3–4) "talks" to selected modules indirectly through these packets and specifically via either the common ops field 528 or the command fields 520–524 thereof. When the core processor has scheduling, setup, changeover, timing or other information for a selected module it passes the information to the module indirectly via headers for the associated channel together with the appropriate module. Thus the behavior of individual modules may be configured on the fly on a channel by channel basis.

As each module receives each packet it performs two operations on the header. An update of the packet data size is performed on every packet when the processes performed by the module, e.g. DFT or IDFT change the size of the payload. The module updates the value in field 320 with the new packet size. The other operation is only performed when the module/component receives a device packet in which its, the modules, unique flag bit in field 522 is set. If its flag bit is set, the module reads data starting from the start of the command portion 310 in an amount corresponding with the command size indicated in field 524. If the command is one to be executed on the current payload then the receiving module makes the changes and processes the payload data 534. If the command sequence is to be performed on a subsequent packet then the module logs the command and frame reference and executes it at the appropriate frame. After reading the command and processing the data, and before transferring the processed device packet to the next module in the queue the detecting module performs the following operations. It deletes its command information effectively by writing the packet out with the succeeding command blocks 532–534 moved from the second and third positions to the first and second positions within the command portion (See detailed views). Then the component updates both the command size in the command size field 524 as well as the packet data size 520.

Figure 6:
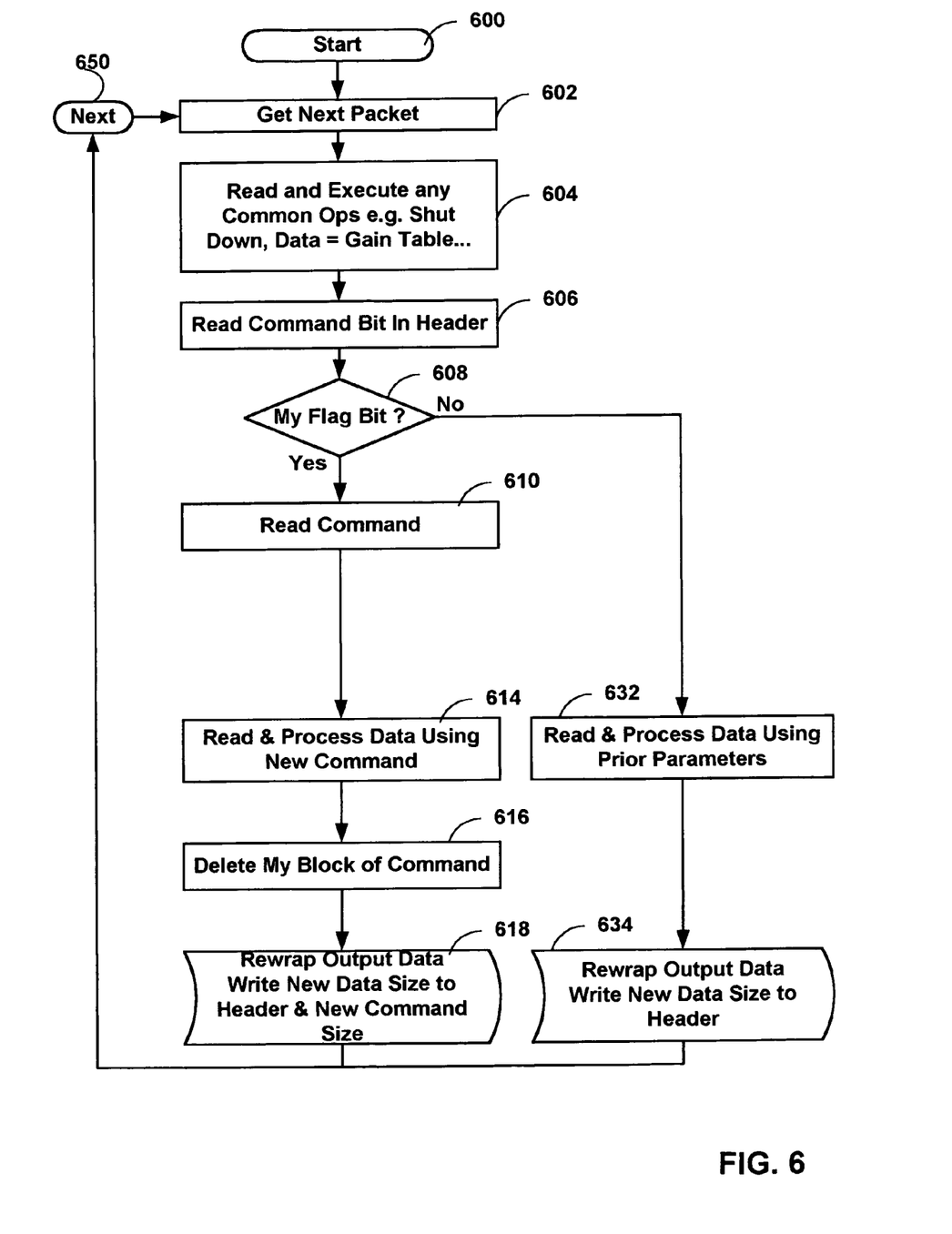
FIG. 6 is a process flow diagram showing the operation of various shared and dedicated components within the DSP in response to the receipt of a upstream or downstream packet.

FIG. 6 is a process flow diagram showing the operation of various shared and dedicated modulation and demodulation modules within the DSP in response to the receipt of upstream or downstream device packets 306. Each of the shared and dedicated components/modules responds to header and control information in the device packets to reconfigure its process parameters for processing of the data portion 312 of the device packet. Device packets may in alternate embodiments of the invention be implemented on either the DSP or the AFE should timing, scheduling, scalability etc. make it advantageous to do so. Processing begins in start bock 600 in which control is passed to process 602 for the receipt of the next packet. Next in process 604 the common ops field 528 (See FIG. 5) is read to see if there are any common ops in the header to be executed. Common ops include a state change for a channel, e.g. active-to-inactive/idle. Then in process 606 the command bit in command flag field 522 is read. If in decision process 608 a determination is made that the flag bit for the corresponding module is not set then that module executes process 632. In process 632 the device packet is processed using parameters previously associated with the channel in main memory 328 (See FIGS. 3–4) or in a memory/register associated with the component. These parameters may be downloaded or fixed part of memory. Next the module updates the header with the new data size in field 520 and passes the packet to the next submodule, module or FIFO buffer. Alternately, if in decision process 608 a determination is made that the flag bit for the module is set, then control is passed to process 610 in which the command is read. Control then passes to processes 614–618. In process 614 the command is acted on or stored for action on a later packet. This later feature permits synchronization with other modules. Next in process 616 the command for the component is deleted from the command block and any remaining commands re-written, e.g. moved forward in the command portion 310. Then in process 618 the updated device packet with processed data and updated header information, e.g. packet size, is assembled and passed to the next component. This approach has the advantage of avoiding detailed timing, synchronization and control of the individual modules. Each component may be individually configured using either in packet or out of packet control techniques.

Figure 7A:
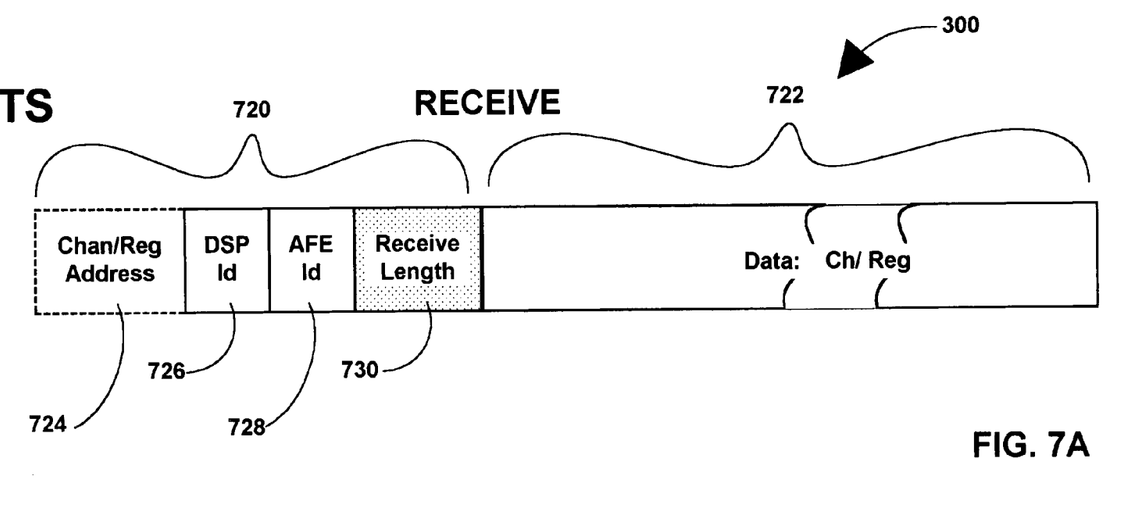
FIGS. 7A–B are detailed structural views of the receive and transmit packets respectively for transport of data on the system bus shown in FIG. 5.
Figure 7B:
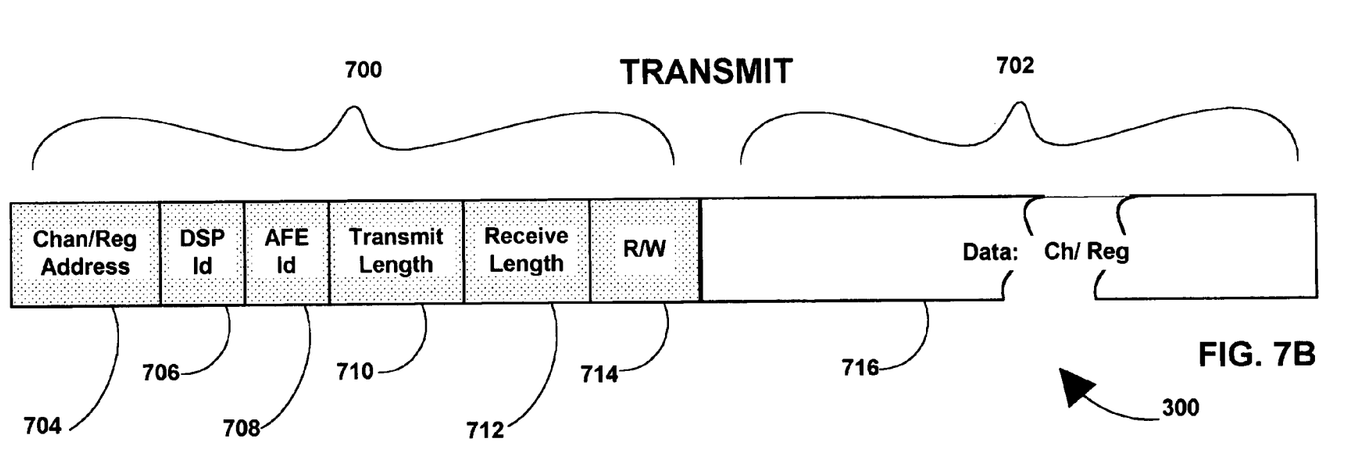

FIGS. 7A–B are detailed structural views of the receive and transmit packets respectively for transport of data on the system bus shown in FIG. 5.

FIGS. 7A–B are detailed structural views of the receive and transmit packets 300 respectively for transport of data on the system bus 216 shown in FIG. 3. The transmit packet comprises a header 700 and a payload portion 702. The header includes fixed length fields 704–714. Field 704 records the channel or control register address. Field 714 is the read/write field. If the field is set with a read bit the DSP is requesting data from the AFE. The data may be channel data or information from a specific module within the AFE.

These latter requests are register requests. A register is the memory location where control parameters for a module are stored. They are memory mapped and are part of control table 480 (See FIG. 4). Alternately, if field 714 is set with a write bit the received packets data portion 702 contains data to be written to a corresponding channel or register. If the data is written to a channel it is communicated through the AFE transmit path for that channel to the subscriber. If the data is written to a register it is communicated to one or more of the modules in the transmit/receive path for processing a particular channel. The DSP ID field 706 is an optional identification field useful when more than one DSP can access the DSP bus. The AFE ID field 708 is used to target a specific AFE on the bus for processing of the packet. When the AFE MAC 474 (See FIG. 4) detects this field it accepts the packet from the bus. The transmit length field 710 indicates for write operations how much data the AFE will expect in the payload portion 702 of the packet. The receive length accompanies a read request in field 714 and indicates how much data the AFE should pass to the requesting DSP.

The receive packet passes from the AFE to the corresponding DSP on bus 216. The bus is bi-directional. The receive packet contains a header 720 and a payload. The header contains fields 726, 728 and 730 for indicating the receiving DSP, the sending AFE, and the length of the payload in the packet, respectively. Optionally the packet may contain a channel/register address field 724 for correlating the payload with a specific channel and register. Where a single DSP masters the bus 216 this field may not be required.

Figure 8A:
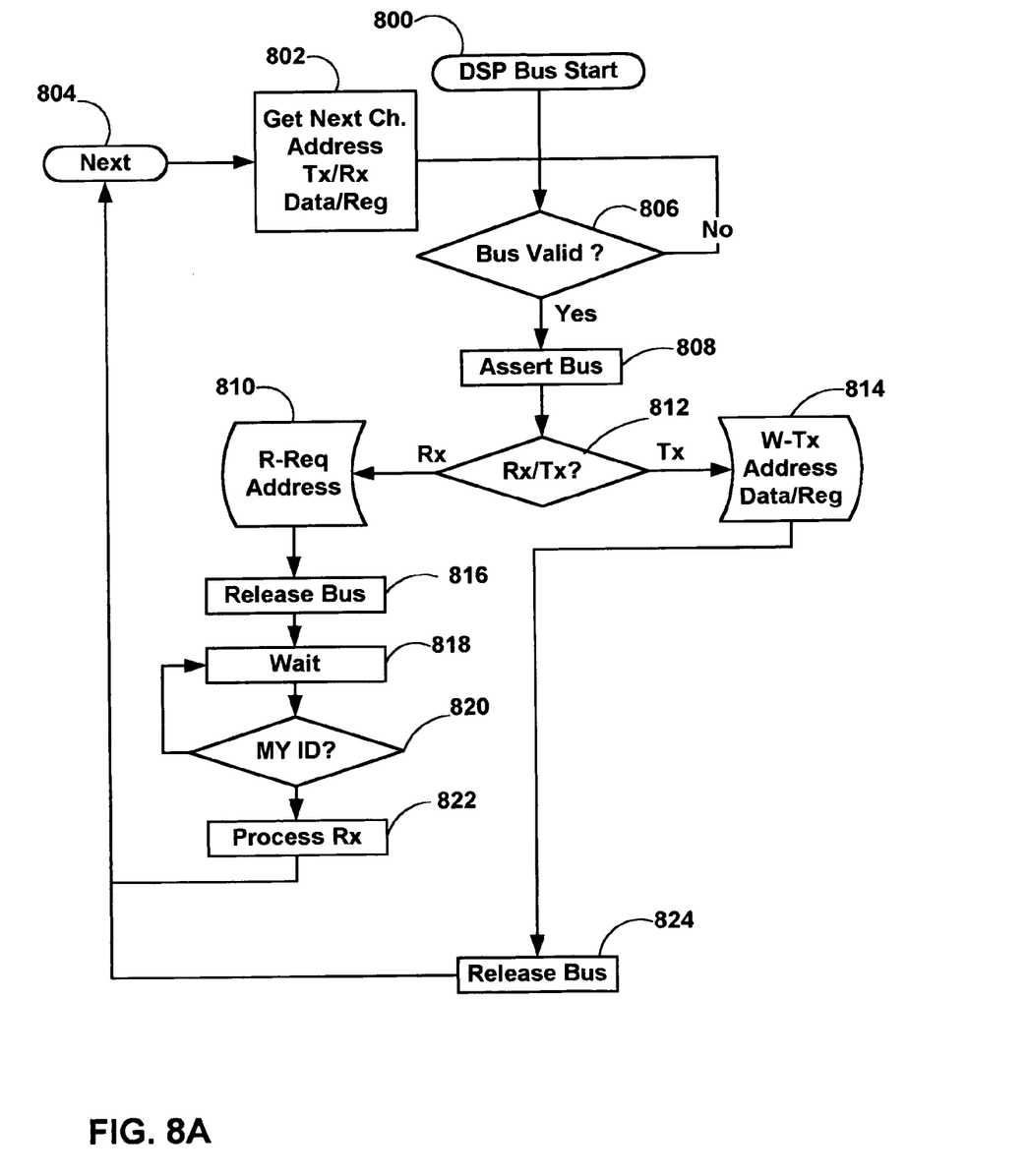
FIGS. 8A–B are process flow diagrams showing a portion of the processes executed by the DSP and AFE I/O interfaces respectively for the transport of data across the bus shown in FIG. 3.
Figure 8B:
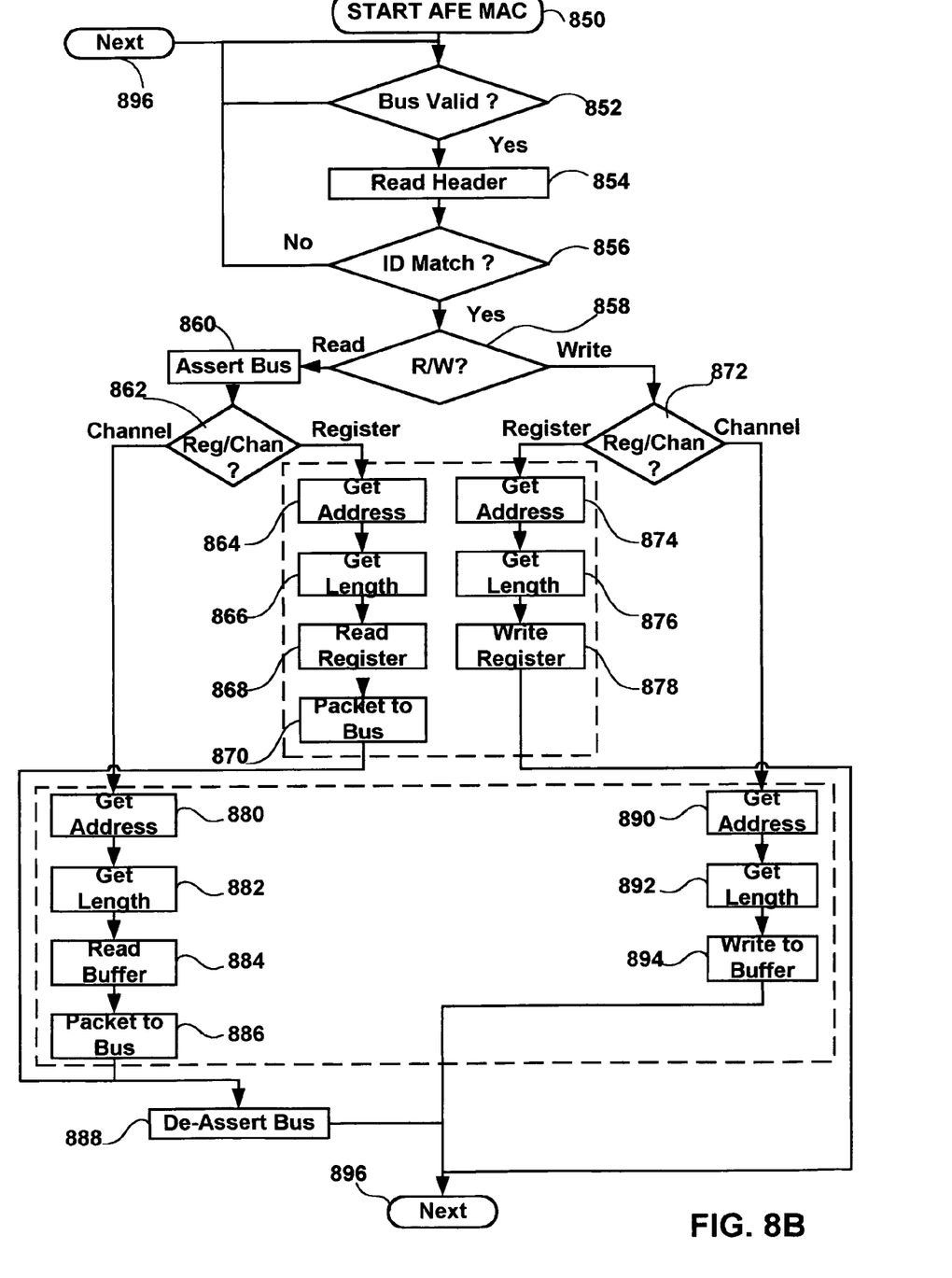

FIGS. 8A–B are process flow diagrams showing a portion of the processes executed by the DSP and AFE I/O interfaces respectively for the transport of data across the bus shown in FIG. 3.

In FIG. 8A processing for the DSP I/O interface begins at start block 800 in which the DSP I/O interface including PAD 316 FIFO buffer controllers and DSP MAC 314 (See FIG. 3) are enabled. Control is passed to decision block 806 in which a determination is made as to the status of bus valid signal line. When that determination is in the affirmative control is passed to process block 808 in which the bus valid signal line is asserted, after which control is passed to decision block 812. In decision block 812 a determination is made based on the channel schedule received from the core processor 334 and/or stored in schedule table 326 as to whether the next scheduled bus transaction for the DSP is a Tx or Rx. If the scheduled operation is a transmit then the PAD 316 gets the next packet to be transmitted from FIFO controller 320 and appends the appropriate header with channel ID etc. Subsequently control is passed to process 824 in which the bus is released by MAC 314. Alternately, if in decision process 812 an receive operation for a selected channel is indicated control is passed to request block 810 in which the PAD 314 prepares a read request header and places it on the bus. Subsequently control passes to process 816 in which the bus valid signal line is de-asserted. Control is then passed to process 818 in which a wait state is introduced, subsequent to which a determination is made in decision block 820 as to whether the bus has been reasserted by the responding AFE. This may also involve a determination as to whether the received packet has an DSP ID field 726 (See FIG. 7A) which corresponds with that of the receiving DSP. If the determination is affirmative, control passes to process block 822 for receipt of the data which is written to FIFO buffer 400 via controller 318. Control then returns to next block 804 in which the core processor supplies the next channel, address, state (Tx/Rx) and other information to the PAD. Control then returns to decision block 806.

In FIG. 8B processing for the AFE I/O interface is set forth. That interface includes AFE MAC 346, PAD 348 and FIFO controllers 350,356 and associated buffers 352,354. Processing begins at start block 850 from which control passes to decision process 852. In decision process 852 a determination is made by the AFE MAC as to whether the Bus Valid signal line is asserted. In the event of an affirmative determination control is passed to process 854. In process 854 the header is read and in the following decision process 856 a determination is made as to whether the AFE ID 728 (See FIG. 7B) in the header matches the AFE ID. In the event of an affirmative decision control is passed to decision block 858. In decision block 858 a determination is made as to whether a read or write tag is present in header field 714 (See FIG. 7B). If a read operation is indicated then in process 860 the AFE MAC asserts the bus valid signal line after which control passes to decision block 862. In decision block 862 the address field 704 in the header (See FIG. 7B) is read to determine whether a register or channel access is requested by the DSP. If a read register request has been indicated then in processes 864–870 the address to be read, the length of the data to be read and the actual reading and packetizing of the data on the bus with the appropriate header are implemented by the combined AFE I/O interface components. Subsequently, control passes to process 888 in which the bus is deasserted and control is passed to next block 896.

Alternately, if in decision process 862 a read channel operation is indicated then in processes 880–886 the channel address and length are determined based on the contents of header fields 704 and 712. Then the FIFO buffer supplies the appropriate data for the selected channel to the PAD 348 appends the appropriate information in the header of the outgoing packet and the MAC 346 (See FIG. 3) places that data on the bus 216.

Alternately, if in decision process 858 a determination is made that the DSP header indicates a write operation then control is passed to decision process 872 in which a determination is made on the basis of the address in the header field 704 (See FIG. 7B) as to whether the write is directed to a register, e.g control table 362 (See FIG. 3) or to a channel. If the write is directed to a channel then in processes 874–878 the payload portion of the bus packet 300 (See FIG. 3) is passed by the AFE I/O interface to the appropriate register after which control is returned to next block 896. Alternatively, if the payload to be written is destined for a channel for a selected subscriber line then control is passed to processes 890–894 in which the payload of the appropriate length is removed from the bus and written to the transmit FIFO buffer 468, subsequent to which control returns to next process block 896.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An X-DSL modem supporting both a discrete multi-tone (DMT) line code and a carrierless amplitude and phase modulated (CAP) line code, and the modem comprising:

a plurality of discrete components coupled to one another to form a transmit path and a receive path for processing data associated with at least one communication channel which exhibits either a DMT line code or a CAP line code; and the components including:

an encoder component coupled to the transmit path for encoding data associated with the at least one communication channel exhibiting the CAP line code into QAM symbols and encoding data associated with the at least one communication channel exhibiting the DMT line code into DMT sub-symbols;

a Fourier transform component with an input coupled to the encoder component on the transmit path for transforming DMT sub-symbols associated with the at least one communication channel exhibiting the DMT line code from a frequency-to-time domain and transforming QAM symbols associated with the at least one communication channel exhibiting the CAP line code from the time-to-frequency domain followed by a filtering step in the frequency domain and a subsequent transformation back from the frequency-to-time domain to effect a pulse shaping function on transmitted data associated with the at least one communication channel exhibiting the CAP line code without requiring a discrete pulse shaping component in the transmit path.

2. The XDSL modem of claim 1 further comprising:
the Fourier transform component further coupled to both the transmit path and the receive path for transforming received data associated with the at least one communication channel exhibiting the DMT line code from the time-to-frequency domain and transforming received data associated with the at least one communication channel exhibiting the CAP line code from the time-to-frequency domain followed by a filtering step in the frequency domain and a subsequent transformation back from the frequency-to-time domain to effect a feedforward equalizer function on received data associated with the at least one communication channel exhibiting the CAP line code without requiring a discrete feedforward equalizer component in the receive path.

3. The XDSL modem of claim 1 further comprising:
at least one upconverter component for upconverting data associated with the at least one communication channel exhibiting the CAP line code; and
at least one switch coupled to the Fourier transform component on the transmit path and to the at least one upconverter component to switchably couple the at least one upconverter component to the Fourier transform component for upconverting transmitted data from the Fourier transform component associated with the at least one communication channel exhibiting the CAP line code and to switchably uncouple the at least one from the upconverter component from the transmit path to avoid upconversion of transmitted data associated with the at least one communication channel exhibiting the DMT line code.

4. The X-DSL modem of claim 1, wherein the at least one communication channel comprises at least a first communication channel exhibiting a DMT line code and a second communication channel exhibiting a CAP line code.

* * * * *